252-150 CROSS REFERENCE EXAMINER

United States Patent Office 3,215,700
Patented Nov. 2, 1965

---

3,215,700
CERTAIN 2-(HYDROXYALKYNYL)-SUBSTITUTED SACCHARINS
Jack L. Towle, East Cleveland, Dale G. Block, Cleveland, and Raymond E. Bailey, Mentor, Ohio, assignors to The Harshaw Chemical Company, Cleveland, Ohio, a corporation of Ohio
No Drawing. Filed Feb. 3, 1964, Ser. No. 34,252
6 Claims. (Cl. 260—301)

This invention relates to new N-hydroxyalkynyl saccharins and more particularly the invention relates to N-hydroxyalkynyl saccharins which are particularly useful as brighteners for nickel electroplating.

The compounds of the present invention may be defined by the following general formula

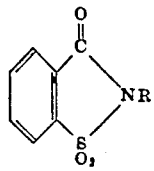

(I)

wherein R is a hydroxyalkynyl radical having from 4 to 8 carbon atoms.

The compounds for Formula I are prepared by the classical reaction of an alkynyl halide with the sodium salt of saccharin (ortho-sulfobenzimide) according to the following equation where for purposes of illustration 1-chloro-4-hydroxybutyne-2 is employed

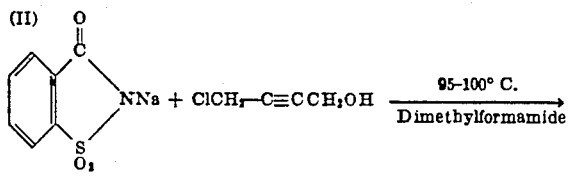

(II)

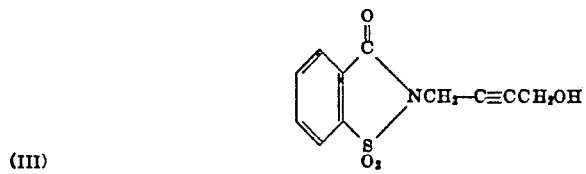

(III)

The above reaction is carried out conveniently in a polar solvent using any of the alkynyl halides including the chlorine, bromine, and iodine derivatives or the alkynyl arylsulfonates such as the benzenesulfonate and the like. The temperature at which the reaction is carried out may be anywhere within the range of from about 60° C. to about 150° C. and more preferably 95° C. to 100° C. Where the reaction is carried out using the longer chain alkynyl groupings, the higher temperatures of the range are, of course, more advantageous.

Examples of polar solvents particularly useful as a medium for carrying out the instant reaction include, in addition to dimethylformamide, dioxane, tetrahydrofuran, dimethylacetamide, 1,2-dimethoxyethane (Glyme), lower aliphatic alcohols such as methanol, ethanol, propanol, and the like.

The hydroxyalkynyl substituent represented by R in Formula I can be any hydroxyalkynyl radical having 4 to 8 carbon atoms, including all of the isomers thereof having 5 to 8 carbon atoms where a methyl or ethyl, a propyl or a butyl radical is attached to a carbon atom at least one carbon atom away from the carbon atoms of the triple bond and including all of those radicals having a hydroxy group attached to a carbon atom at least one carbon away from the carbon atoms of the triple bond and at least one carbon atom away from the carbon atom immediately adjacent the nitrogen atom. The triple bond may be anywhere in the chain but must not bridge either of the terminal carbon atoms or the carbon atom immediately adjacent the nitrogen atom.

Specific compounds which may be used as reactants with saccharin to prepare compounds coming within the scope of Formula I include 1-chloro-4-hydroxybutyne-2, 1-chloro-5-hydroxypentyne-2, 1-chloro-6-hydroxyhexyne-2, 1-bromo-7-hydroxyheptyne-2, 1-benzenesulfonate-8-hydroxyoctyne-4, 2-chloro-5-hydroxypentyne-3, 3-bromo-6-hydroxyhexyne - 4, 2-bromo-2-methyl-5-hydroxypentyne-3,1-benzenesulfonate-3-hydroxyheptyne-5, and the like.

The class of compounds of the present invention as indicated hereinbefore are particularly useful as second class brighteners for nickel electroplating baths. The fact they may be used advantageously as brighteners is surprising and unexpected inasmuch as the N-propargyl derivatives of saccharin are extremely active, causing misplating or skip-plating in the recessed areas of the object being plated—the areas of low current density.

While the reasons for the striking difference in properties of the series of compounds defined in Formula I as compared with the N-propargyl saccharins are not known with certainty, the following explanation is given. It is to be understood that the invention in no way is intended to be limited thereby but is to aid those skilled in the art in understanding the invention.

It is well known that water-soluble triple bond-containing compounds (the various water-soluble acetylenic compounds) are very active in producing bright nickel deposited from electroplating baths (see U.S. Patent No. 2,712,522). It is generally understood by those skilled in the art that the brightening action of these compounds is contingent upon their being adsorbed on the surface of the object being plated. When used in conjunction with the sulfo-oxygen carrier, the triple bond-containing compounds comprise one component of a two-component system which acts in an unknown manner to produce a bright deposit of lamellar nickel containing various amounts of sulfur. It is well known that many of the water-soluble acetylenic compounds, when used as brighteners in a nickel plating solution, have a detrimental effect on the deposit. This detrimental effect takes the form of "skip" or missed plate in low current density areas of the cathode being plated, this is assumed to be the result of either excessive adsorption or a special type of adsorption of the acetylenic compound on the cathode being plated. The N-propargyl derivative of saccharin is an example of these compounds that is adsorbed too intensely on the surface of the object being plated.

The series of compounds of the instant invention, however, having the terminal hydroxyl group are not nearly so active and may be used over a much wider range of concentrations without appreciable problems with misplating or skip-plating. Moreover, the presence of the hydroxyl group permits the longer chains (pentyne, hexyne and heptyne derivatives) to be solubilized more easily; the hydroxyl group enhances the hydrophillic properties of the compound.

The following examples are given by way of illustration and not by way of limitation. All parts and percentages are by weight unless otherwise specified.

EXAMPLE I

The following example illustrates the preparation of 1-hydroxy-4-[N-(sulfobenzimido)]-butyne-2.

Into a suitable vessel equipped with magnetic stirrer, thermometer and reflux condenser is placed 24.6 grams (0.12 mole) of sodium saccharin in 50 cc. of dimethylformamide as solvent. 10.5 grams (0.1 mole) of 1-chloro-4-hydroxybutyne-2 is then added (all at once) to the flask. The mixture is then heated to a temperature in the range of from 95–100° C. for 1½ hours during which time the solution turns dark red in color and a white crystalline precipitate (NaCl) separates from the solution. The mixture is cooled to 30° C. and poured into an excess of ice water. The solid which separates is filtered, washed with cold water to remove starting material and dried. The crystallized product has a Melting Point of 120° C.–121° C. and a white color.

*Elemental analysis*

Carbon (percent) _____Found 52.51, theoretical 52.59.
Hydrogen (percent) ____Found 3.64, theoretical 3.58.
Nitrogen (percent) ____Found 5.50, theoretical 5.58.

*Infrared analysis*

| Groups indicated: | Infrared bands cm.$^{-1}$ |
|---|---|
| Hydroxyl (—OH) | 1055, 3500 |
| Carbonyl (=C=O) | 1640 |
| Aromatics (—C=C—) | 1600 |
| Methylene $\left(-\underset{|}{\text{C}}\text{H}_2\right)$ | 1425, 1480 |
| Sulfonamide $\left(-\underset{|}{\text{SO}_2\text{N}}\right)$ | 1190, 1315, 1340 |
| Phenylene 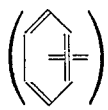 | 755 |

EXAMPLE II

Substituting 1-benzenesulfonate-4-hydroxybutyne-2 for the chloro derivative in Example I, the example is repeated substantially as set forth therein. The resulting product is identical to that obtained according to Example I.

EXAMPLE III

The following example illustrates the preparation of 1-hydroxy-8-[N-(sulfobenzimido)]-octyne-4.

Into a three-necked round bottomed flask equipped with magnetic stirrer, thermometer and reflux condenser is placed 24.6 grams (0.12 mole) sodium saccharin in 50 cc. of dimethyl formamide as solvent. 20.5 grams (0.1 mole) of 1-bromo-8-hydroxyoctyne-4 is then added (all at once) to the flask. The mixture is then heated to a temperature in the range of from 95–100° C. for about 1½ hours. The mixture is cooled and poured into an excess of ice water. The solid which separates is filtered, washed with cold water to remove starting materials and air dried.

EXAMPLE IV

Using sodium saccharin and 2-chloro-2-methyl-5-hydroxypentyne-2 as the reactants, the procedure of Example I is followed substantially.

The resulting product is 1-hydroxy-5[N-(sulfobenzimido)]-5,5-dimethylbutyne-2.

The following examples set forth the use of the compound prepared by Example I as a brightening additive in the electroplating of nickel from an aqueous acid plating solution.

EXAMPLE A

A Watts bath having a pH of 3.7 and containing 3 grams per liter of p,p'-oxy-bis(dibenzenesulfonimide) was electrolyzed at a temperature of 140° F. and a current density of 40 amperes per square foot. The deposit of nickel was considered to be semi-bright. 0.12 gram per liter of the compound prepared according to Example I was then added to the bath and then another nickel layer was electro-deposited. This nickel deposit was bright.

EXAMPLE B

Another Watts bath having a pH of 3.7 containing 2 grams per liter saccharin and 1 gram per liter allyl sulfonate was electrolyzed at 140° F. at 40 amperes per square foot. The resulting deposit was semi-bright. Using the same bath 0.14 gram per liter of the compound prepared according to Example I was added thereto and the electrodeposition resumed. The resulting deposit was very bright.

EXAMPLE C

Using the second Watts bath of Example B without the compound of Example I, 0.01 gram per liter of N-propargyl-o-sulfobenzimide was added to the bath solution and electrolysis conducted as before using the same conditions. The deposit was very bright but manifested severe misplating.

The instant hydroxyalkynyl saccharins may also be used advantageously as an inhibitor in an acid pickling bath. Examples of pickling baths include those comprised of the strong mineral acids such as hydrochloric acid, nitric acid and sulfuric acid. Metals easily oxidizable, such as iron and steel, are advantageously pickled using baths containing these inhibitors.

While specific examples of the invention have been set forth hereinabove, it is not intended that the invention be limited solely thereto, but to include all of the variations and modifications falling within the scope of the appended claims.

What is claimed is:

1. A chemical compound of the formula

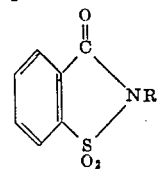

wherein R is hydroxyalkynyl and has from 4 to 8 carbon atoms.

2. A compound of the formula

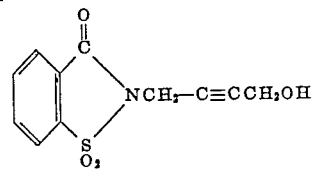

3. A compound of the formula

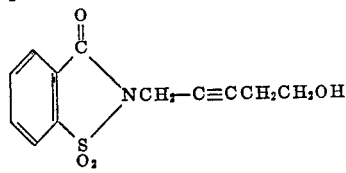

4. A compound of the formula

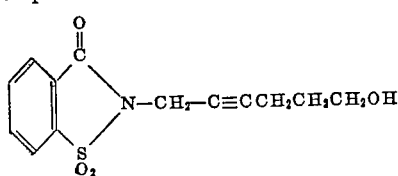

5. A compound of the formula
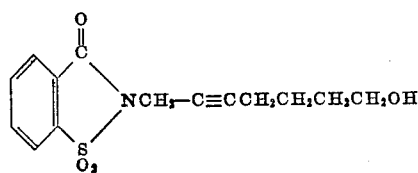
6. A compound of the formula
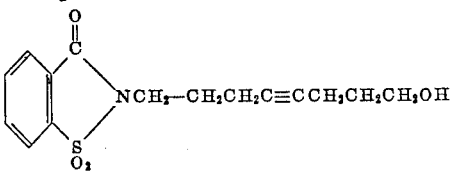
No references cited.
NICHOLAS S. RIZZO, *Primary Examiner.*
HENRY JILES, *Examiner.*